(12) United States Patent
Park et al.

(10) Patent No.: US 8,641,212 B2
(45) Date of Patent: Feb. 4, 2014

(54) ANTI-REFLECTION FILM AND DISPLAY DEVICE INCLUDING THE SAME, AND MANUFACTURING METHOD OF ANTI-REFLECTION FILM AND MASTER FILM THEREFOR

(75) Inventors: Soon-Ryong Park, Yongin (KR); Woo-Suk Jung, Yongin (KR); Duk-Jin Lee, Yongin (KR); Jae-Yong Kim, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 402 days.

(21) Appl. No.: 12/970,805

(22) Filed: Dec. 16, 2010

(65) Prior Publication Data
US 2011/0149403 A1 Jun. 23, 2011

(30) Foreign Application Priority Data
Dec. 18, 2009 (KR) .................. 10-2009-0127302

(51) Int. Cl.
*G02B 27/00* (2006.01)
*G02B 1/11* (2006.01)

(52) U.S. Cl.
CPC .............. *G02B 1/11* (2013.01); *G02B 27/0018* (2013.01)
USPC ............................ 359/601; 359/599; 359/613

(58) Field of Classification Search
USPC .................................. 359/599, 601, 586, 613
See application file for complete search history.

(56) References Cited

U.S. PATENT DOCUMENTS

| | | | |
|---|---|---|---|
| 6,891,677 B2 * | 5/2005 | Nilsen et al. | 359/625 |
| 2007/0159698 A1 * | 7/2007 | Taguchi et al. | 359/586 |
| 2008/0088933 A1 * | 4/2008 | Lin | 359/599 |
| 2008/0145609 A1 * | 6/2008 | Lin et al. | 428/141 |
| 2009/0002832 A1 * | 1/2009 | Tochigi et al. | 359/599 |
| 2011/0100827 A1 * | 5/2011 | Hayashi et al. | 205/112 |

FOREIGN PATENT DOCUMENTS

| | | | |
|---|---|---|---|
| JP | 2003-302532 | 10/2003 | |
| JP | 2007-25508 | * 2/2007 | 359/601 |
| JP | 2008-122435 | 5/2008 | |
| KR | 10-2008-0018074 | 7/2008 | |
| KR | 10-2009-0020961 | 2/2009 | |
| WO | WO 2009/147858 | * 10/2009 | 359/601 |
| WO | WO 2009/144970 A1 | 12/2009 | |

* cited by examiner

*Primary Examiner* — Thong Nguyen
(74) *Attorney, Agent, or Firm* — Christie, Parker & Hale, LLP (57) ABSTRACT

An anti-reflection film and a display device including the same, and a manufacturing method of an anti-reflection film and a master film therefor. The anti-reflection film includes an anti-glare and anti-reflection layer, a surface of the anti-glare and anti-reflection layer having an anti-glare pattern for scattering incident light and an anti-reflection pattern.

9 Claims, 8 Drawing Sheets

ANTI-REFLECTION FILM AND DISPLAY DEVICE INCLUDING THE SAME, AND MANUFACTURING METHOD OF ANTI-REFLECTION FILM AND MASTER FILM THEREFOR

CROSS-REFERENCE TO RELATED APPLICATION

This application claims priority to and the benefit of Korean Patent Application No. 10-2009-0127302, filed in the Korean Intellectual Property Office, on Dec. 18, 2009, the entire content of which is incorporated herein by reference.

BACKGROUND

1. Field

The following description relates generally to an anti-reflection film and a display device including the same, and a manufacturing method of an anti-reflection film and a master film therefor.

2. Description of Related Art

In order to reduce or prevent outdoor sunlight, indoor lighting, etc. from being reflected on surfaces of various display devices and obstructing an original image from being viewed properly, it is necessary to reduce as much as possible the reflection of various external light occurring on the surface of a display device. Reflections on a surface can be divided into specular reflection and diffuse reflection. The specular reflection refers to a case where an incident angle and a reflection angle on a surface are identical to each other. The specular reflection takes place on a surface that may be assumed to be almost completely or substantially flat. On the other hand, the diffuse reflection takes place due to surface irregularities, and refers to a case where incident light is not entirely reflected at the same angle as an incident angle, but the reflected light is instead scattered according to the degree of surface irregularity.

Methods of reducing or preventing the reflection of external light occurring on the surface of a display device include an anti-glare (AG) coating method and an anti-reflection (AR) coating method.

The AG coating involves scattering external light by providing a surface with protrusions and depressions so as to have roughness of several tens to several hundreds of nanometers (nm). That is, the AG coating is a method of reducing specular reflection by forming an uneven surface on the outermost side of a display device and reducing the intensity of reflected light entering the field of vision of an observer situated at a particular angle and obtaining the result thereof. The size of the protrusions and depressions may be determined by the wavelength of light and an irregularity in appearance, and the protrusions and depressions should be uniformly distributed so as to cause diffuse reflection to occur over the entire surface.

As opposed to the AG that obtains a scattering effect to diffuse reflection, the AR coating exhibits an anti- or non-reflection effect by decreasing the reflectance of specular reflection. Although the AG coating allows for effective distribution of the reflection of external light, the AG coating has a drawback in that an image passing through an AG coating surface shows a decrease in sharpness due to the effect of the protrusions and depressions of the surface. Thus, the AR coating for reducing the reflectance of specular reflection is used when it is required to display a clear image.

The above information disclosed in this Background section is only for enhancement of understanding of the background of the described technology and therefore it may contain information that does not form the prior art that is already known in this country to a person of ordinary skill in the art.

SUMMARY OF THE INVENTION

Aspects of embodiments of the present invention are directed toward a film having both anti-glare and anti-reflection functions and a simple method of manufacturing the same.

Another aspect of an embodiment of the present invention is directed toward a master film for manufacturing a film having both anti-glare and anti-reflection functions.

An exemplary embodiment provides an anti-reflection film including an anti-glare and anti-reflection layer, a surface of the anti-glare and anti-reflection layer having an anti-glare pattern having, e.g., an anti-glare function for scattering incident light and an anti-reflection pattern having e.g., an anti- or non-reflection function.

The anti-glare pattern may include irregular protrusions and depressions.

The anti-reflection pattern may include regular protrusions and depressions.

Intervals between the protrusions and depressions of the anti-glare pattern may be greater than intervals between the protrusions and depressions of the anti-reflection pattern.

The anti-reflection pattern may include a moth-eye pattern.

The moth-eye pattern may have from two to five protrusions and depressions per micrometer ($\mu m$).

The moth-eye pattern may include regularly arranged protrusions and depressions.

The anti-reflection pattern may be formed on the surface of the anti-glare pattern.

The anti-glare and anti-reflection layer may include an ultraviolet curable resin.

The anti-reflection film may further include a substrate positioned under the anti-glare and anti-reflection layer.

A display device according to one exemplary embodiment includes the anti-reflection film.

An exemplary embodiment provides a master film for manufacturing an anti-reflection film, the master film including a double pattern surface, the double pattern surface having an anti-glare pattern having, e.g., an anti-glare function for scattering incident light and an anti-reflection pattern having, e.g., an anti- or non-reflection function.

The anti-glare pattern may include irregular protrusions and depressions.

The anti-reflection pattern may include regular protrusions and depressions.

Intervals between the protrusions and depressions of the anti-glare pattern may be greater than intervals between the protrusions and depressions of the anti-reflection pattern.

The anti-reflection pattern may include a moth-eye pattern.

The moth-eye pattern may include two to five protrusions and depressions per micrometer ($\mu m$).

The moth-eye pattern may include regularly arranged protrusions and depressions.

The anti-reflection pattern may be formed on the surface of the anti-glare pattern.

The master film may include a thermally curable resin composed of a polycarbonate (PC).

An exemplary embodiment provides a manufacturing method of an anti-reflection film. The method includes: manufacturing a master film for manufacturing an anti-reflection film including a double pattern surface; positioning the master film on a curable resin layer; and transferring a shape of the double pattern surface to the curable resin layer by pressing the curable resin layer and the master film, the double pattern surface of the master film having an anti-glare pattern having, e.g., an anti-glare function for scattering incident light and an anti-reflection pattern having, e.g., an anti- or non-reflection function.

The anti-glare pattern may include irregular protrusions and depressions.

The anti-reflection pattern may include regular protrusions and depressions.

Intervals between the protrusions and depressions of the anti-glare pattern may be greater than intervals between the protrusions and depressions of the anti-reflection pattern.

The anti-reflection pattern may include a moth-eye pattern.

The moth-eye pattern may include two to five protrusions and depressions per micrometer ($\mu$m).

The moth-eye pattern may include regularly arranged protrusions and depressions.

The master film may include a thermally curable resin composed of a polycarbonate (PC).

The method may further include curing the curable resin layer by light radiation.

The transferring of the shape of the double pattern surface to the curable resin layer by pressing the curable resin layer and the master film may include utilizing a pressure roller.

The manufacturing of the master film may include: positioning a first film for use as a master film on an anti-glare pattern film; positioning a master roll on the first film for use as the master film; and pressing the first film for use as the master film onto the anti-glare pattern film by the master roll.

The master roll may include a master pattern layer with the anti-reflection pattern formed thereon.

The anti-reflection pattern may be formed on the surface of the master roll.

The anti-glare pattern film may include an anti-glare pattern layer with the anti-glare pattern formed thereon.

According to an embodiment of the present invention, it is possible to easily and simply manufacture an anti-reflection film having both anti-glare and anti-reflection functions.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Initially, a method of manufacturing a master film for the manufacture of an anti-reflection film according to one exemplary embodiment is described below in more detail with reference to FIG. 1, FIG. 2, FIG. 3, FIG. 4, and FIG. 5.

Figure 1:
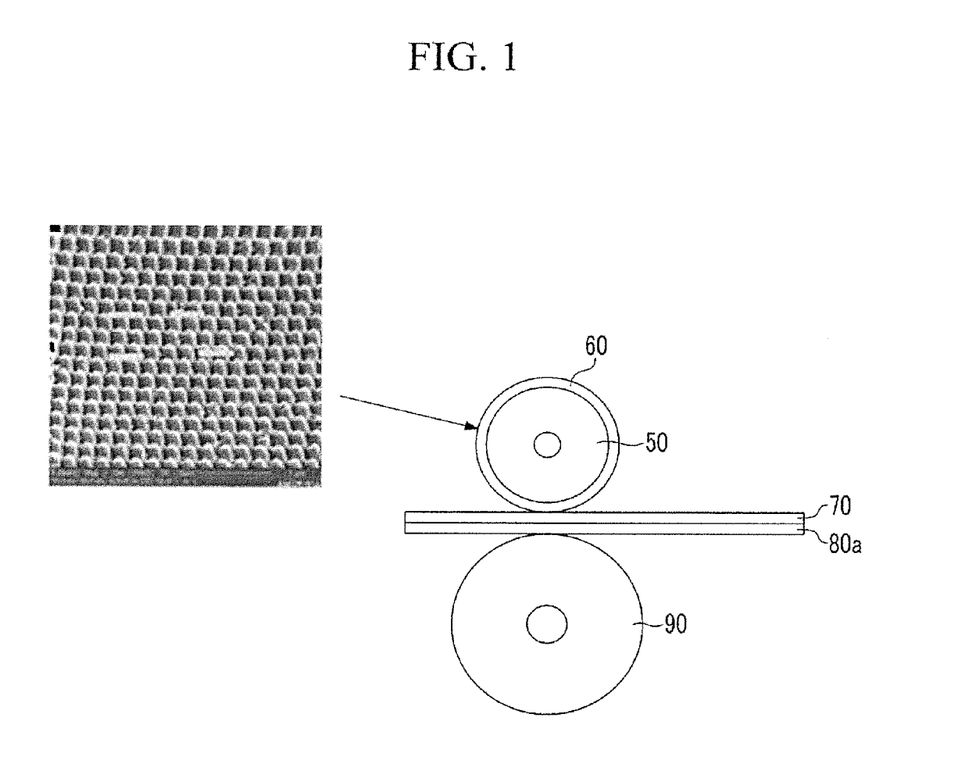
FIG. 1 is a view showing a method of forming a master film for manufacturing an anti-reflection film according to one exemplary embodiment.
Figure 2:
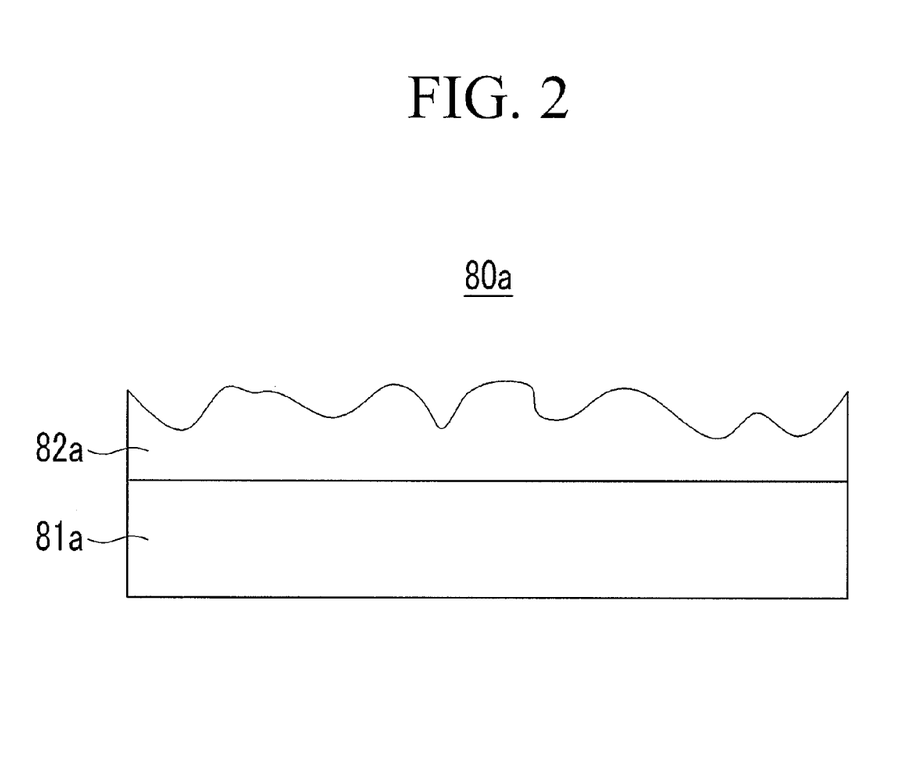
FIG. 2 is a cross-sectional view of an anti-glare pattern film of FIG. 1.
Figure 3:
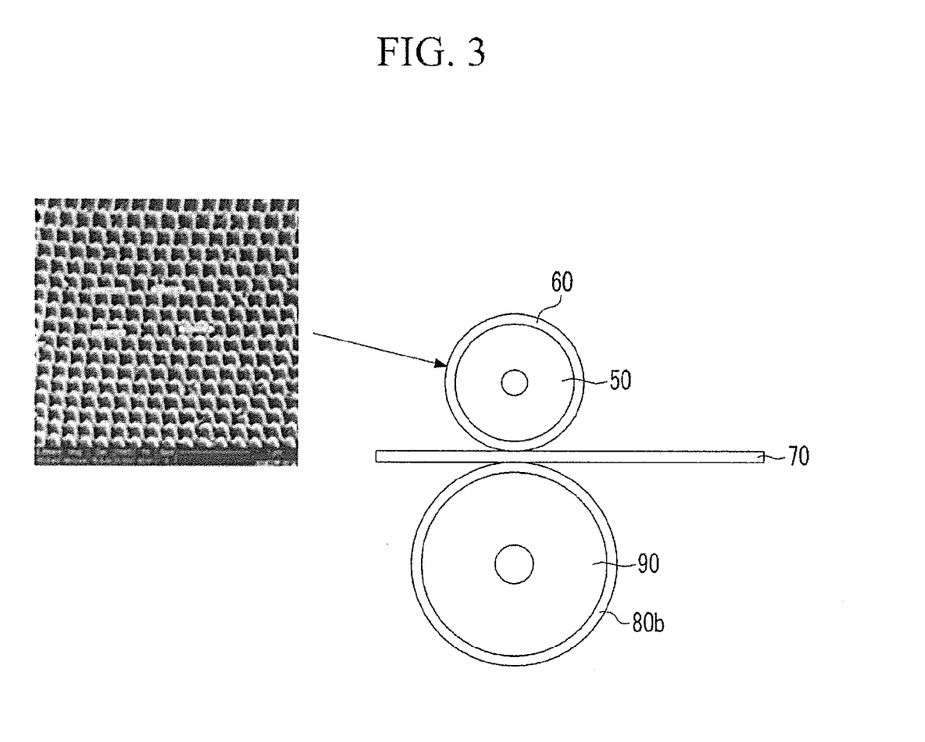
FIG. 3 is a view showing a method of forming a master film for manufacturing an anti-reflection film according to another exemplary embodiment.
Figure 4:
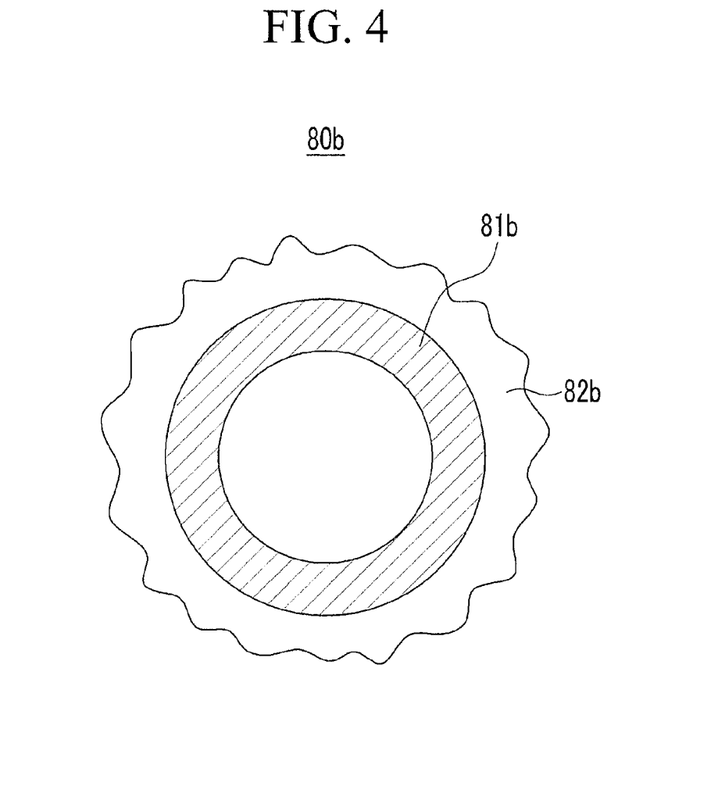
FIG. 4 is a cross-sectional view of the anti-glare pattern film of FIG. 2.
Figure 5:
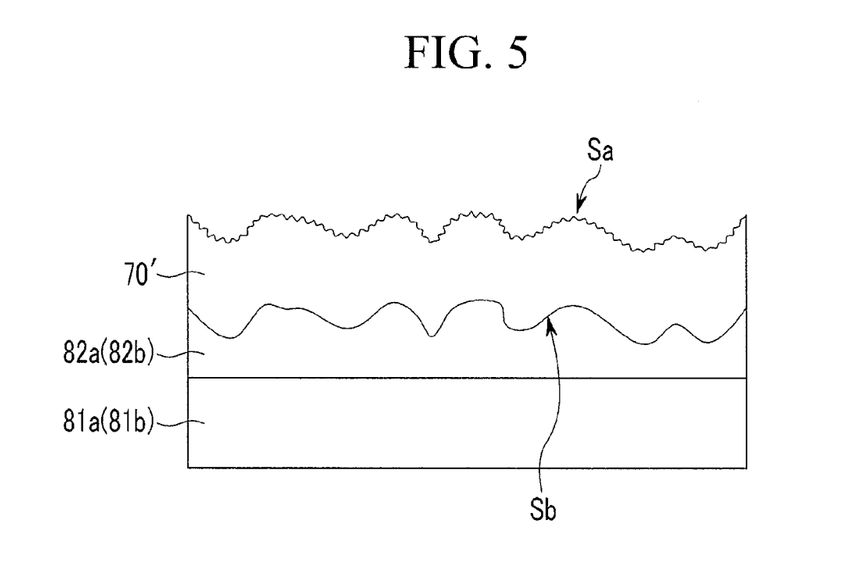
FIG. 5 is a cross-sectional view of the formed master film for manufacturing an anti-reflection film and of the anti-glare pattern film.

FIG. 1 is a view showing a method of forming a master film for manufacturing an anti-reflection film according to one exemplary embodiment, FIG. 2 is a cross-sectional view of an anti-glare pattern film of FIG. 1, FIG. 3 is a view showing a method of forming a master film for manufacturing an anti-reflection film according to another exemplary embodiment, FIG. 4 is a cross-sectional view of the anti-glare pattern film of FIG. 2, and FIG. 5 is a cross-sectional view of the formed master film for manufacturing an anti-reflection film and of the anti-glare pattern film.

Referring to FIG. 1, a master film for manufacturing an anti-reflection film according to one exemplary embodiment can be manufactured by positioning an anti-glare pattern film 80a and a film 70 for use as a master film between a lower roll 90 and an upper roll 50 and pressing them while rotating the lower roll 90 and the upper roll 50.

Referring to FIG. 2, an anti-glare pattern film 80a includes a substrate 81a which can be made of a plastic film, such as polyethylene terephthalate (PET), polyethylene (PE), etc, and an anti-glare pattern layer 82a formed on the substrate 81a. The anti-glare pattern layer 82a can be made of a metal, etc, and the upper surface thereof has irregular roughness, i.e., irregular protrusions and depressions, of several tens to several hundreds of nanometers (nm). The irregular protrusions and depressions of the anti-glare pattern layer 82a function to irregularly scatter external light on an uneven surface. The irregular protrusions and depressions of the anti-glare pattern layer 82a can be formed by etching a metal, etc.

The film 70 for use as a master film can be made of a curable plastic film, such as polycarbonate (PC), and particularly, a thermally curable plastic that is hardened by heat. The film 70 for use as a master film is placed on the anti-glare pattern film 80a.

The upper roll 50 at the side of the film 70 for use as a master film has a moth-eye master pattern layer 60 rolled thereon. A regular moth-eye pattern is formed on the moth-eye master pattern layer 60. Here, in one embodiment, the moth-eye pattern has from two to five protrusions and depressions per micrometer ($\mu$m); and, in one embodiment, the moth-eye pattern has from three to four protrusions and depressions per micrometer ($\mu$m). The moth-eye pattern may be made of protrusions and depressions having a smaller size than that of the irregular protrusions and depressions of the anti-glare pattern layer 82a. That is, intervals between the protrusions and depressions of the moth-eye pattern may be less than intervals between the protrusions and depressions of the anti-glare pattern layer 82a. The moth-eye pattern of this type can have an anti- or non-reflection function for reducing the reflection of light incident from the outside. Here, the anti-reflection function refers to the function of reducing the amount of reflected light compared to the amount of incident light.

The moth-eye master pattern layer 60 and the upper roll 50 are combined together to form a master roll. Unlike the present exemplary embodiment as shown, a moth-eye pattern may be formed directly on the surface of the upper roll 50 without the moth-eye pattern layer 60.

As such, a master film 70' shown in FIG. 5 for manufacturing an anti-reflection film can be manufactured by placing the film 70 for use as a master film on the anti-glare pattern film 80*a* and pressing and heating them by the two rollers 50 and 90.

According to another exemplary embodiment, as shown in FIGS. 3 and 4, an anti-glare pattern film 80*b* may be rolled on the lower roll 90. The anti-glare pattern film 80*b* according to the present exemplary embodiment includes a substrate 81*b*, which can be made of a plastic film, etc. contacting the lower roll 90 and an anti-glare pattern layer 82*b* formed on the outer side of the substrate 81*b*. The anti-glare pattern layer 82*b* can also have irregular protrusions and depressions of several tens to several hundreds of nanometers (nm) that can scatter external light. In the exemplary embodiment shown in FIGS. 3 and 4, the film 70 for use as a master film is positioned between the upper roll 50 on which the moth-eye master pattern layer 60 is rolled and the lower roll 90 on which the anti-glare pattern film 80*b* is rolled.

The thus-manufactured master film 70' for manufacturing an anti-reflection film has a contact surface Sb contacting the anti-glare pattern layer 82*a* and 82*b* and a double pattern surface Sa on the opposite side thereof as shown in FIG. 5.

The contact surface Sb has the same shape as the irregular protrusions and depressions of the anti-glare pattern layer 82*a* and 82*b* by being pressed in contact with the anti-glare pattern layer 82*a* and 82*b* of the anti-glare pattern film 80*a* and 80*b*.

On the other hand, the double pattern surface Sa has both a regular moth-eye pattern and irregular protrusions and depressions by having the irregular protrusions and depressions of the contact surface Sb or anti-glare pattern layer 82*a* and 82*b* transferred thereto and having the moth-eye pattern of the moth-eye master pattern 60 rolled on the upper roll 50 imprinted thereon. That is, the overall silhouette of the double pattern surface Sa has irregular protrusions and depressions and the height of the double pattern surface Sa varies depending on the height of the irregular protrusions and depressions of the contact surface Sb, and more specifically, irregular protrusions and depressions of a moth-eye pattern are engraved on the surface of the double pattern surface Sa, i.e., on the surface of the irregular protrusion and depression pattern. The double pattern surface Sa of the master film 70' for manufacturing an anti-reflection film can have both the anti-glare function for scattering incident external light and the anti-reflection function using the moth-eye pattern.

A manufacturing method of an anti-reflection film having anti-glare and anti-reflection functions using a master film for manufacturing an anti-reflection film according to one exemplary embodiment is described below in more detail with reference to FIGS. 6, 7, and 8.

Figure 6:
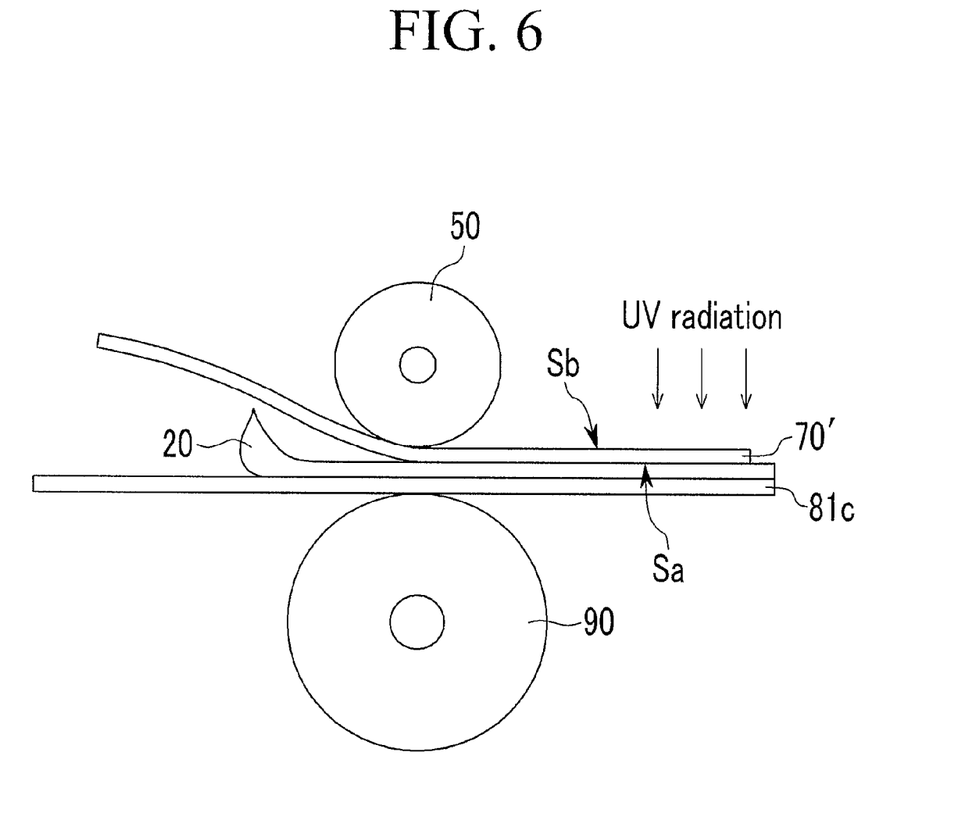
FIG. 6 is a view showing a manufacturing method of an anti-reflection film having anti-glare and anti-reflection functions using the formed master film for manufacturing an anti-reflection film according to one exemplary embodiment.
Figure 7:
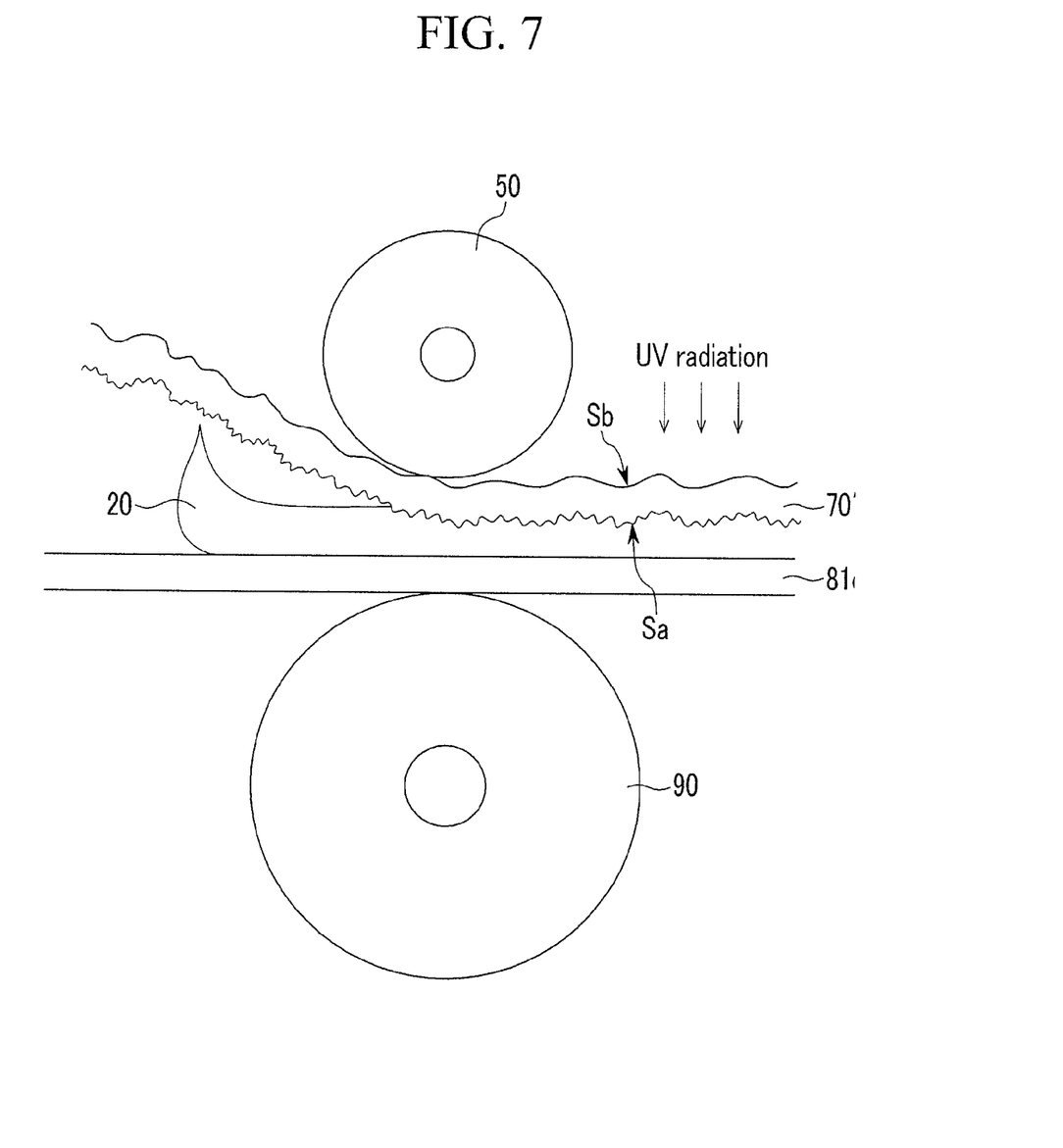
FIG. 7 is an enlarged view of FIG. 6.
Figure 8:
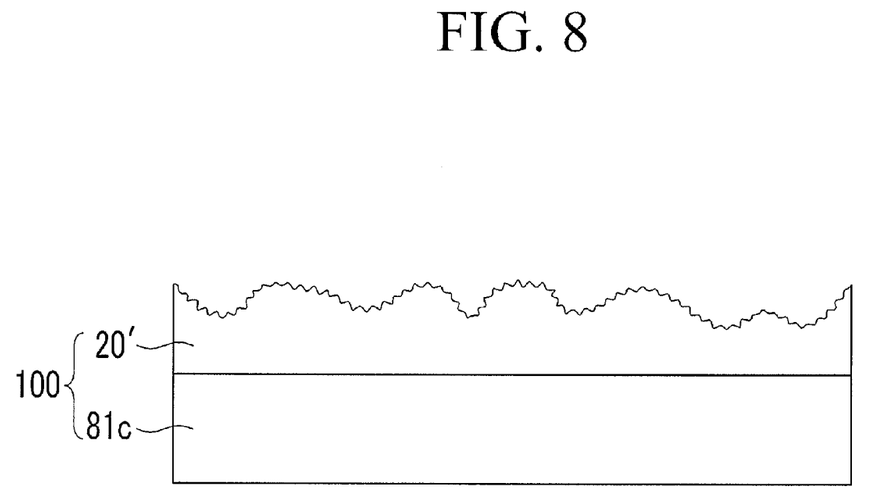
FIG. 8 is a cross-sectional view of the anti-reflection film having anti-glare and anti-reflection functions manufactured according to the method of FIG. 6.

FIG. 6 is a view showing a manufacturing method of an anti-reflection film having anti-glare and anti-reflection functions using the formed master film for manufacturing an anti-reflection film according to one exemplary embodiment, FIG. 7 is an enlarged view of FIG. 6, and FIG. 8 is a cross-sectional view of the anti-reflection film having anti-glare and anti-reflection functions manufactured according to the method of FIG. 6.

One surface of the master film 70' for manufacturing an anti-reflection film in the present exemplary embodiment has irregular protrusions and depressions as shown in FIG. 7, and a moth-eye pattern having smaller protrusions and depressions is formed on the surfaces of these irregular protrusions and depressions. The above master film for manufacturing an anti-reflection film can be formed by the above-explained method of FIGS. 1 to 5.

Referring to FIG. 6, a substrate 81*c* is positioned on the lower roll 90, a curable resin 20 is deposited on the substrate 81*c* to form a curable resin layer, and the master film 70' for manufacturing an anti-reflection film is positioned thereon. Then, the upper roll 50 is positioned on the master film 70' for manufacturing an anti-reflection film, and the master film 70' is pressed while rotating the upper roll 50 and the lower roll 90. Light, such as ultraviolet rays, is radiated onto the substrate 81*c* having passed between the two rollers 50 and 90 to cure the curable resin layer. Alternatively, the curable resin layer may be cured by heat.

In addition, referring to FIG. 7, irregular protrusions and depressions forming a silhouette and a moth-eye pattern provided on the surfaces thereof are formed on the double pattern surface Sa where the master film 70' for manufacturing an anti-reflection film is in contact with the curable resin layer. Accordingly, a pattern having the same shape as the double pattern surface Sa is formed on the upper surface of the cured resin layer by pressing and rotating the rollers 50 and 90.

With this, a cured resin layer having an upper surface where irregular protrusions and depressions forming an overall silhouette and a moth-eye pattern provided on the surface thereof, that is, an anti-glare and anti-reflection (AG-AR) layer 20' having anti-glare and anti-reflection functions can be easily and simply manufactured. The anti-glare and anti-reflection layer 20', together with the substrate 81*c* thereunder, forms a film having anti-glare and anti-reflection functions, that is, an anti-reflection film 100.

The irregular protrusions and depressions forming the overall silhouette on the upper surface of the anti-glare and anti-reflection layer 20' of the thusly manufactured anti-reflection film 100 can perform the anti-glare function by inducing the scattering of external light, and the moth-eye pattern having irregular protrusions and depressions of a smaller size formed on the surfaces of the irregular protrusions and depressions can perform the anti-reflection function by reducing reflection as an AR coating does.

Figure 9:
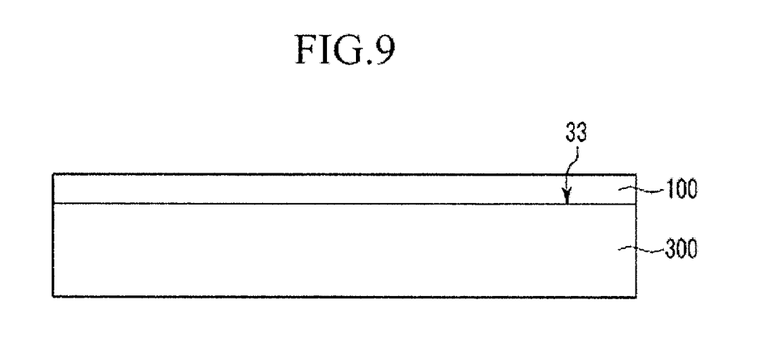
FIG. 9 is a view illustrating a display device with an anti-reflection film attached thereto according to one exemplary embodiment.

FIG. 9 is a view illustrating a display device with an anti-reflection film attached thereto according to one exemplary embodiment.

Referring to FIG. 9, the anti-reflection film 100 according to one exemplary embodiment can be attached and used on a display surface 33 of various suitable display devices 300, such as a liquid crystal display device, an organic light emitting display device, etc. By attaching the anti-reflection film 100 having the anti-reflection and anti-reflection functions onto a display device, the anti-reflection film 100 can prevent or protect an image of the display device from being affected by external light.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. An anti-reflection film comprising an anti-glare and anti-reflection layer,
a surface of the anti-glare and anti-reflection layer having an anti-glare pattern for scattering incident light and an anti-reflection pattern, wherein the anti-glare pattern comprises irregular protrusions and depressions of several tens to several hundreds of nanometers; and the anti-reflection pattern comprises a pattern having from two to five protrusions and depressions per micrometer.

2. The anti-reflection film of claim 1, wherein the anti-reflection pattern comprises regular protrusions and depressions.

3. The anti-reflection film of claim 2, wherein intervals between the protrusions and depressions of the anti-glare pattern are greater than intervals between the protrusions and depressions of the anti-reflection pattern.

4. The anti-reflection film of claim 1, wherein the anti-reflection pattern comprises a moth-eye pattern.

5. The anti-reflection film of claim 4, wherein the moth-eye pattern comprises regularly arranged protrusions and depressions.

6. The anti-reflection film of claim 1, wherein the anti-reflection pattern is on the surface of the anti-glare pattern.

7. The anti-reflection film of claim 1, wherein the anti-glare and anti-reflection layer comprises an ultraviolet curable resin.

8. The anti-reflection film of claim 1, wherein the anti-reflection film further comprises a substrate positioned under the anti-glare and anti-reflection layer.

9. A display device comprising the anti-reflection film of claim 1.

\* \* \* \* \*